(12) United States Patent
Paczkowski et al.

(10) Patent No.: US 12,051,910 B2
(45) Date of Patent: Jul. 30, 2024

(54) SYSTEMS AND METHODS FOR PERFORMING HIGH SPEED INTERACTIONS WITH ELECTROMAGNETIC POWER HARVESTING CHIPS

(71) Applicant: T-Mobile Innovations LLC, Overland Park, KS (US)

(72) Inventors: Lyle Walter Paczkowski, Mission Hills, KS (US); Mark Richard Bales, Lee's Summit, MO (US); Lyle T. Bertz, Lee's Summit, MO (US); Pei Hou, Centreville, VA (US); Harry William Perlow, Palm Harbor, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 89 days.

(21) Appl. No.: 17/816,972

(22) Filed: Aug. 2, 2022

(65) Prior Publication Data
US 2024/0047994 A1    Feb. 8, 2024

(51) Int. Cl.
*H02J 50/00* (2016.01)
*H02J 50/20* (2016.01)
*H02J 50/80* (2016.01)

(52) U.S. Cl.
CPC .......... *H02J 50/001* (2020.01); *H02J 50/20* (2016.02); *H02J 50/80* (2016.02)

(58) Field of Classification Search
CPC .......... H02J 50/001; H02J 50/20; H02J 50/80
See application file for complete search history.

(56) References Cited

U.S. PATENT DOCUMENTS

| 10,050,470 | B1* | 8/2018 | Leabman | H02J 50/80 |
| 11,258,302 | B1 | 2/2022 | Marquardt et al. | |
| 2016/0100312 | A1* | 4/2016 | Bell | G06Q 20/20 |
| | | | | 455/411 |
| 2016/0299210 | A1* | 10/2016 | Zeine | H02J 50/40 |

* cited by examiner

Primary Examiner — Jeffrey M Shin
(74) Attorney, Agent, or Firm — Shook, Hardy & Bacon L.L.P.

(57) ABSTRACT

Systems and methods for performing high speed interactions with electromagnetic power harvesting (AEPH) chips are provided. In one embodiment, an AEPH initialization node emits a first electromagnetic field to charge the AEPH chip and/or initiate a boot-up sequence, and an AEPH interrogation node that transmits a second electromagnetic field to trigger processing operations within the AEPH chip. The first electromagnetic field and second electromagnetic fields are emitted respectively within an AEPH initialization zone and an AEPH interrogation zone that are offset from each other such that the first electromagnetic field emission in the AEPH initialization zone does not produce backscatter that interferes with the AEPH interrogation node receiving interrogation reply signals from the AEPH interrogation zone. Curtailing backscatter facilitates the ability to convey items with AEPH chips at faster line speeds so that a greater number of items per minute can be processed.

20 Claims, 10 Drawing Sheets

SYSTEMS AND METHODS FOR PERFORMING HIGH SPEED INTERACTIONS WITH ELECTROMAGNETIC POWER HARVESTING CHIPS

BACKGROUND

Various package tracking technologies are available today to track items as they are transported through a facility. Optical codes (such as bar codes or QR-codes) represent one such tracking technology where an encoded graphic can be read by an optical reading device and decoded to obtain information about the item- and optionally update a database accordingly. However, optical code technologies are challenged when used in environments such as high speed packaging lines, for example, where items may travel past the optical scanner at rates exceeding 2000 items per minute. Moreover, optical code technologies rely on the line-of-sight alignment between the optical code and the optical scanner so that the scanner can recognize and read the optical code. Furthermore, if the item is placed in a bin or other container for transport, the optical code is obscured and can no longer be read. Radio frequency identity (RFID) represent another tracking technology that utilizes small inexpensive semiconductor devices that can be read without reliance on line-of-sight alignment. When irradiated with an appropriate electromagnetic field, an RFID chip draws power from the energy in the electromagnetic field and wirelessly transmits back an identity via a radio frequency. An RFID scanning or reading devices is used to stimulate the RFID chips with the electromagnetic field, and read the information broadcast by the RFID chips in response to receiving the electromagnetic field. However, existing RFID tracking technologies are also challenged when used in environments such as high speed packaging lines. As the speed of a packaging line increases, correspondingly stronger electromagnetic field are needed so that the RFID chip can draw enough power from the fields to quickly power up and transmit interrogation responses. The need to increase the signal power of the electromagnetic field produces excessive signal backscattering of the electromagnetic field, which in turn interferes with reading the reply signal transmissions from the RFID chip.

SUMMARY

The present disclosure is directed, in part to systems and methods for performing high speed interactions with electromagnetic power harvesting chips, substantially as shown and/or described in connection with at least one of the Figures, and as set forth more completely in the claims.

Embodiments presented in this disclosure provide for, among other things, radio frequency (RF) based technologies for tracking products or other items, including performing high speed interactions with ambient electromagnetic power harvesting (AEPH) chips. Such a system can include an AEPH initialization node that emits a first electromagnetic field to charge the AEPH chip and/or initiate a boot-up sequence. The system may also include a AEPH interrogation node that transmits a second electromagnetic field (which can be at a different frequency from the first electromagnetic field) to trigger one or more processing operations within the AEPH chip including providing information from memory to the AEPH interrogation node, write to memory information received from the AEPH interrogation node, and/or other processing operations. The first electromagnetic field and second electromagnetic field are each emitted into separate zones (referred to herein respectively as an AEPH initialization zone and an AEPH interrogation zone) that are offset (e.g., physically separated by a distance and/or separated with respect to RF frequency, channel, or band) such that the electromagnetic energy field emission used for charging the AEPH chip in the AEPH initialization zone does not produce a backscatter that interferes with the AEPH interrogation node receiving and reading interrogation reply signals from the AEPH interrogation zone. Moreover, signal separation can further be obtained by using electromagnetic signals of different frequencies for charging and interrogation functions. Curtailing backscatter and increasing signal separation facilitate the ability to convey items with AEPH chips through AEPH initialization zone and AEPH interrogation zone at faster line speed so that a greater number of items per minute can be processed as compared to prior technologies. Based on information read from an AEPH chip, AEPH interrogation nodes may further query one or more backend server applications and/or ledgers (such as but not limited to a distributed ledger) to obtain additional information about an item, and/or to carry other operations using the AEPH chip. In some embodiments, information obtained from backend server applications and/or ledgers may be written onto the AEPH chip.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
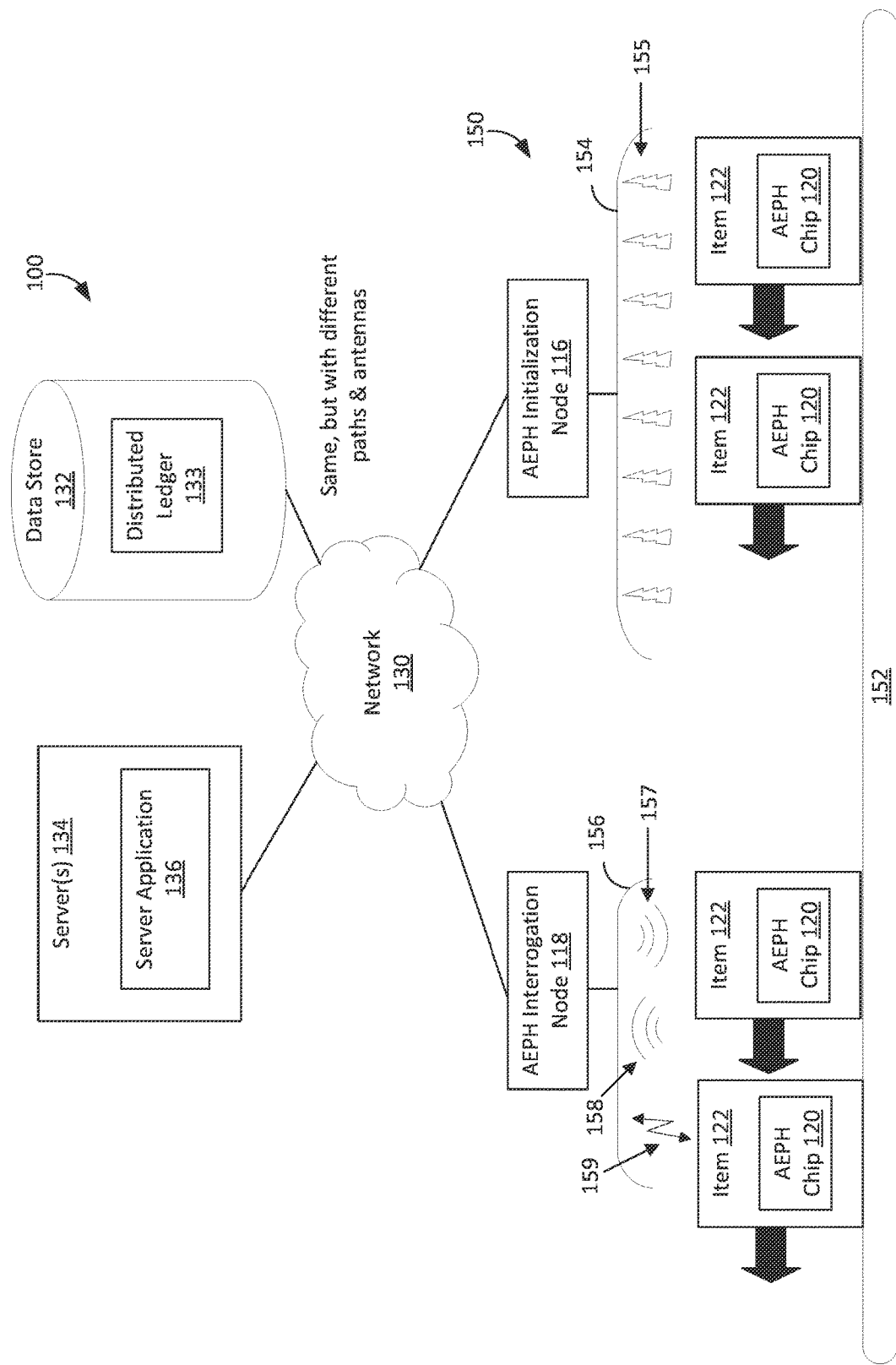
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, systems and methods for performing high speed interactions with electromagnetic power harvesting chips. In embodiments describe herein a system comprises an AEPH initialization node and an AEPH interrogation node that exchange electromagnetic fields and signals with one or more ambient electromagnetic power harvesting (AEPH) chips in order to read information from the AEPH chips, write information to the AEPH chips, and/or perform other operation with the AEPH chips. In the embodiments described herein, the AEPH initialization node is arranged to generate an electromagnetic field into an AEPH initialization zone. When an AEPH chip enters and/or is present within the AEPH initialization zone, the AEPH chip is able to harvest energy from the electromagnetic field to charge a power storage device that is used by the AEPH chip to power processing circuitry and perform processing operations. Once charged by the electromagnetic field from the AEPH initialization node, the AEPH chip may executed a boot-up or initialization sequence that executes one or more processes in anticipation of upcoming interrogation tasks.

The AEPH interrogation node is similarly arranged to generate an electromagnetic field into an AEPH interrogation zone. When an AEPH chip enters and/or is present within the AEPH interrogation zone (after having been initialized in the AEPH initialization zone) the AEPH chip is responsive to interrogation signals transmitted by the AEPH interrogation node to trigger one or more processing operations including providing information from memory to the AEPH interrogation node, write to memory information received from the AEPH interrogation node, or other processing operations. The AEPH interrogation zone can be separated from the AEPH initialization zone by an offset that provides physical separation such that the electromagnetic energy field emission used for charging the AEPH chip in the AEPH initialization zone does not produce a backscatter that interferes with the AEPH interrogation node receiving and reading interrogation reply signals from the AEPH interrogation zone. Moreover, the offset can be established through signal separation obtained by using an electromagnetic energy field in the AEPH initialization zone comprising a frequency different than frequencies used for transmitting interrogation and interrogation reply signals in the AEPH interrogation zone. In some embodiments, the electromagnetic energy field in the AEPH initialization zone comprising is transmitted in a different frequency band than a frequency band used for transmitting interrogation and interrogation reply signals in the AEPH interrogation zone. As explained herein, curtailing backscatter and increasing signal separation facilitate the ability to convey items with AEPH chips through AEPH initialization zone and AEPH interrogation zone at faster line speed so that a greater number of items per minute can be processed as compared to prior technologies.

In some embodiments, AEPH interrogation nodes may read identification information, from an AEPH chip. Such identification information may include, for example, trade item information, supply chain partner information, product serial numbers, product batch/lot numbers, logistic information such as container codes, or similar product related information. Based on the identification information, AEPH interrogation nodes may further query one or more backend server applications and/or ledgers (such as but not limited to a distributed ledger) to obtain additional information about an item, and/or to carry other operations using the AEPH chip. In some embodiments, information obtained from backend server applications and/or ledgers may be written onto the AEPH chip.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

The subject matter described herein is generally described in the context of a wireless communications network. This is done merely for the sake of clarity and those skilled in the art may, upon reading this description, understand other contexts in which the subject matter may be utilized. For example, embodiments described herein may be implemented in the context of other networks, such as but not limited to data centers, commercial and business networks, infrastructure networks (such as an A/C power grid), economic and/or financial computing networks (such as used for high-frequency trading, flash trading, and generalized electronic trading), air traffic control networks, first responder networks (such as EMS, police, fire rescue, and the like), amongst others. Again, however, even these examples are not provided to limit the scope of this description.

As used herein, the terms "function", "unit", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

FIG. 1 is a diagram illustrating an example network environment 100 embodiment. Network environment 100 is but one example of a suitable network environment for use in implementing embodiments of the present disclosure and is not intended to suggest any limitation as to the scope of use or functionality of the embodiments disclosed herein. Neither should the network environment 100 be interpreted as having any dependency or requirement relating to any one or combination of components illustrated. Other arrangements and elements (e.g., machines, interfaces, functions, orders, and groupings of functions, etc.) can be used in addition to, or instead of, those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that network environment 100 shown in FIG. 1 is an example of one suitable operating environment. Among other components not shown, network environment 100 includes an AEPH initialization node 116, an AEPH interrogation node 118, at least one network 130, a data store 132, and one or more servers 134. These components may communicate with each other via network 130, which may be wired, wireless, or both. Network 130 can include multiple networks, or a network of networks, but is shown in simple form so as not to obscure aspects of the present disclosure. By way of example, network 130 can include one or more wide area networks (WANs), one or more local area networks (LANs), one or more public networks such as the Internet, and/or one or more private networks. Where network 130 includes a wireless telecommunications network, components such as a base station, a communications tower, or even access points (as well as other components) may provide wireless connectivity. Networking environments are commonplace in offices, enterprise-wide computer networks, intranets, and the Internet. In some embodiments, network environment 100 comprises at least a portion of a wireless communications network such as described with respect to FIG. 7A.

It should be understood that any number of user devices, servers, and other components may be employed within network environment 100 within the scope of the present disclosure. Each may comprise a single device or multiple devices cooperating in a distributed environment. The AEPH initialization node 116 and AEPH interrogation node 118 may be implemented as user equipment (UE), that are in general forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. Other examples of UE for implementing AEPH initialization node 116 and/or AEPH interrogation node 118 include handheld personal computing devices such as cellular phones, tablets, and similar consumer equipment, or stationary desktop computing devices, workstations, servers and/or network infrastructure equipment. As such, the AEPH initialization node 116 and/or AEPH interrogation node 118 may include both mobile UE and stationary UE. The AEPH initialization node 116 and/or AEPH interrogation node 118 can include one or more processors, and one or more non-transient computer-readable media for executing code to carry out the functions of these devices described herein. The computer-readable media may include computer-readable instructions executable by the one or more processors.

Network 130 can include multiple networks, or a network of networks, but is shown in simple form so as not to obscure aspects of the present disclosure. By way of example, network 130 can include one or more wide area networks (WANs), one or more local area networks (LANs), one or more public networks such as the Internet, and/or one or more private networks. Where network 130 includes a wireless telecommunications network, the network may include components such as a base station, a communications tower, or access points (as well as other components) to provide wireless connectivity. Such an example telecommunications network is described below with respect to FIG. 7A. In some embodiments, the network 130 comprises a network edge that defines the boundary of a network operator core and serve as the architectural demarcation point where the network operator core connects to other networks such as, but not limited to the Internet, or other third-party networks. It should be understood that in some aspects, the network environment 100 may not comprise a distinct network operator core, but rather may implement one or more features of the network operator core within other portions of the network, or may not implement them at all, depending on various carrier preferences.

In the embodiment shown in FIG. 1, the AEPH initialization node 116 and AEPH interrogation node 118 are used in conjunction for communicating with one or more AEPH chips 120. Each AEPH chip 120 includes power management and other functionalities that perform different task and/or operations when exposed to different levels of available ambient EM power at different frequencies. Each AEPH chips 120 is either embedded within, or affixed to, a corresponding item 122 and stores information about that item, such as, but not limited to an item identification information (e.g., an item ID), such as, but not limited to, a serial number, model number, or the like. For example, the identification information may include GS1 Identification Numbers, an Electronic Product Code (EPC) or Universal Product Code (UPC) from the AEPH chip 120 for the item 122. An example of such an AEPH chip 120 may be found in U.S. Pat. No. 11,258,302 "Ambient electromagnetic power harvesting chip adaptation based on available power level", granted Feb. 22, 2022, which is incorporated herein by reference in its entirety. However, it should be understood that this is just an example and in other embodiments, the AEPH initialization node 116 and/or AEPH interrogation node 118 may work in conjunction with other AEPH chips.

In the embodiment shown in FIG. 1, AEPH initialization node 116 and/or AEPH interrogation node 118 may communicate (for example, via network 130) with at least one server application 136 hosted by a server 134. Server 134 may comprise a node of a local area network (e.g., a local network domain) that also includes one or both of the AEPH initialization node 116 and AEPH interrogation node 118. Alternatively, server 134 may comprise a node of a back-end network of a remote domain (e.g., a non-local network domain). In some embodiments, the server application 136 comprises a back-end application for tracking and/or providing information about of items 122 (such as products, inventory, packages, for example). As an example, the server application 136 may comprise an enterprise GS1 Standards supply chain and/or inventory management application.

In some embodiments, AEPH initialization node 116 and/or AEPH interrogation node 118 may communicate (for example, via network 130) with at least one distributed ledger 133 hosted by a data store 132. The distributed ledger may comprise a blockchain based distributed ledger such as, but not limited to, a HyperLedger for example.

In the embodiment shown in FIG. 1, the AEPH initialization node 116 and AEPH interrogation node 118 are deployed as components of a tracking system 150. Tracking system 150 may be deployed at a facility, such as a warehouse, factory, or packaging facility (for example) for performing tasks such as tracking, managing, packaging, inventorying, distributing, shipping, or other similar tasks involving the rapid transport and/or conveyance of items 122. For purposes of illustration, FIG. 1 will be described in the context of a packaging line where items 122 are rapidly transported by a conveyance mechanism 152 (such as a conveyor belt, or other conveyor system). Each item 122 has embedded within, affixed to, or otherwise packaged with, an AEPH chip 120. The AEPH chip 120 may have stored thereon identification information for the item 122, such as but not limited to a unique serial number. In some embodiments, each item 122 may be located within another box our other container, which may also include one or more other items 122 contained therein.

The AEPH initialization node 116 and AEPH interrogation node 118 can be arranged with respect to the conveyance mechanism 152 such that as items travel along the conveyance mechanism 152, they first encounter the AEPH initialization node 116 and then the AEPH interrogation node 118. In such an embodiment, each item 122 (and its corresponding AEPH chip 120) initially enters an AEPH initialization zone 154 located along the path of the conveyance mechanism 152. Within the AEPH initialization zone 154, power storage for the AEPH chip 120 is charged by the AEPH initialization node 116 using a wireless electromagnetic energy field 155 of a first frequency. The item 122 subsequently travels into an AEPH interrogation zone 156 located along the path of the conveyance mechanism 152. Within the AEPH interrogation zone 156, the AEPH chip 120 is triggered to perform one or more operations in response to electromagnetic energy fields 157 generated by the AEPH interrogation node 118 at one or more second frequencies different from the first frequency of the wireless electromagnetic energy field 155. Although FIG. 1 illustrates tracking system 150 as comprising a single AEPH initialization node and a single AEPH interrogation node, it should be appreciated that in other embodiments, tracking system 150 may comprise one or more AEPH initialization nodes and one or more AEPH interrogation nodes each establishing respectively corresponding AEPH initialization zones and AEPH interrogation zones.

Separation of the AEPH initialization nodes from AEPH interrogation zones allows for powering of AEPH chips that are moving through the tracking system 150 at a high rate of speed (2000 items per minute or faster, for example). This is because the wireless electromagnetic energy field 155 can be increased in power accordingly to support faster AEPH chip charging rates without substantial backscatter of the electromagnetic energy field 155 interfering with the operation of the AEPH interrogation node 118. The distance of physical separation of the AEPH initialization nodes from AEPH interrogation zones is readily computed by those skilled in the art based on the attenuation rate of electromagnetic radiation in air as a function of distance and frequency, and that attenuation can be augmented by optional signal attenuating barriers between the AEPH initialization zones from AEPH interrogation zones. Moreover, the signal power level of the wireless electromagnetic energy field 155 can be reduced by extending the length of the AEPH initialization zone so that each AEPH chip 120 can be charge for a greater duration of time—as the AEPH chip 120 travels through the AEPH initialization zone for a greater duration of time.

For example, in one embodiment in operation, AEPH initialization node 116 emits electromagnetic energy filed 155 to charge the AEPH chips 120 within AEPH initialization zone 154 without attempting to read them. The AEPH initialization node 116 thus essential functions to charge the power source of the AEPH chip 120 and, in some embodiments, to initiate one or more processes that prepares the AEPH Chip 120 for subsequent interrogation. For example, upon charging of the AEPH chip 120, a payload may be retrieved from a memory into a buffer for preparation for transmission, and execution of one or more processes responsive to interrogation signals from the AEPH interrogation node 118 can be initiated. The AEPH interrogation node 118 may then read the AEPH chips 120 as the package or item moves forward through the AEPH interrogation zone 156. The interrogation of the AEPH chip 120 may be performed using different frequencies than used for charging the AEPH chip 120. For example, the AEPH chip 120 may be charge with an electromagnetic power field 155 at a first frequency (e.g., 2.496 GHz at 100 Watts) and triggered to transmit data by an interrogation signal (i.e., electromagnetic energy fields 157) at a second frequency (e.g. 947 MHz at 1 watt). The response data may be transmitted via an interrogation reply signal 158 readable by the AEPH interrogation node 118 and carry data such as item identification information. In some embodiments, response data may be transmitted via a bidirectional wireless communication link 159 (which may comprise an encrypted and/or secured communication link).

In some embodiments, a AEPH interrogation zone 156 may comprise two AEPH interrogation nodes 118 that both might attempt to read the data from interrogation reply signal 158. As an example, a first AEPH interrogation node 118 may read a first component of a data field from the AEPH chip 120, and a second AEPH interrogation node 118 may read a second component of the data field from the AEPH chip 120. In some embodiments, to the extent that in certain circumstances one or more AEPH interrogation nodes 118 cannot accurately capture the item identification information or other response data, the nodes may access ledger data from distributed ledger 133 to supplement response data.

For example, in some embodiments, one or more AEPH interrogation nodes 118 may read identification information, such as but not limited to, one or more GS1 Identification Numbers, from the AEPH chip 120 that is relevant to the item 122. Such identification information may include, for example, trade item information, supply chain partner information, product serial numbers, product batch/lot numbers, logistic information such as container codes, or similar product related information. Based on the identification information, AEPH interrogation node(s) 118 may further query the server application 136 to obtain additional information about the item 122, and/or to carry out and record an operation using the AEPH chip 120.

In some embodiments, the server application 136 may communicate with the distributed ledger 133 to obtain information about the item 122 in response to identification information read from the AEPH chip 120. For example, a manufacture or vendor of the item 122 may have previously recorded data pertaining to the item 122 to the distributed ledger 133. The server application 136 may also record operations between the AEPH interrogation node(s) 118 and AEPH chip 120 to the distributed ledger 133. For example, the AEPH interrogation node(s) 118 and AEPH chip 120 may execute an operational function on the AEPH chip 120 and the AEPH interrogation node(s) 118 may communicate the operations details (such as a serial numbers, time, date, identification of involved parties, for example) to the server application 136 which then records the operational details to the distributed ledger 133. In some embodiments, rather than (or in addition to) the AEPH interrogation node(s) 118 communicating with the distributed ledger 133 via the server application 136, the distributed ledger 133 itself comprises one or more smart contracts that one or more applications on the AEPH interrogation node(s) 118 interact with directly. In some embodiments, AEPH interrogation node(s) 118 may transmit a plurality of different interrogation signals 157 to trigger execution of different operations and/or obtain different sets of data from the AEPH chips 120. Moreover, it should be understood that any one task or transaction between the AEPH interrogation node(s) 118 and the AEPH chip 120 may involve a sequence of several EM signal transmissions to invoke a set of various subtasks within the AEPH chip 120.

Figure 2:
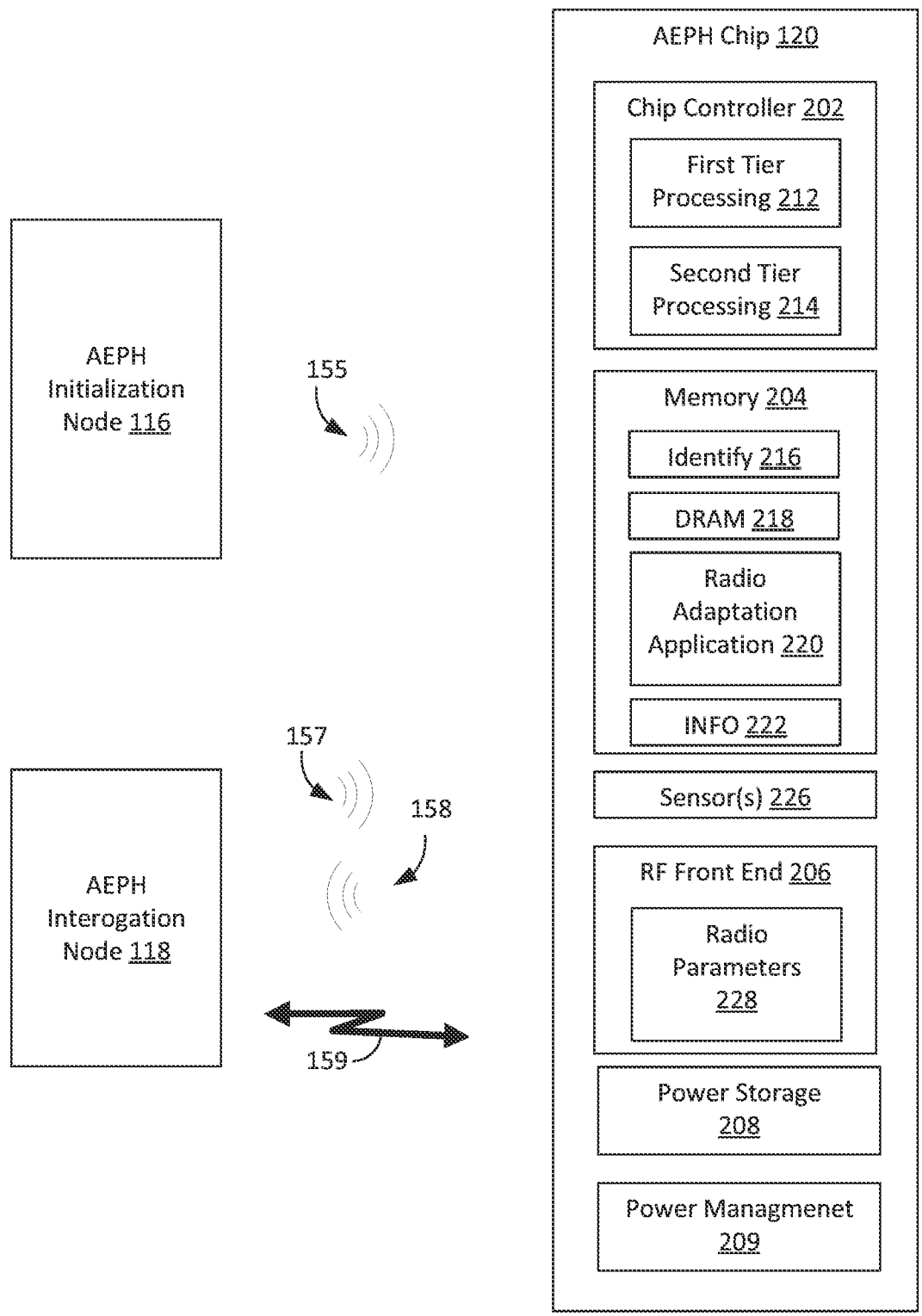
FIG. 2 is a diagram illustrating an example Ambient electromagnetic power harvesting (AEPH) chip, in accordance with some embodiments described herein.

Turning now to FIG. 2, FIG. 2 illustrates an example AEPH chip 120 that may be used in conjunction with the AEPH initialization node 116 and AEPH interrogation node 118 in accordance with embodiments of this disclosure. In an embodiment, the AEPH chip 120 comprises chip controller 202 (e.g., comprising one or more processors or processor cores), memory 204, and an RF front end 206 (e.g., radio circuitry). In some embodiments, in a first mode of operation, the AEPH chip 120 harvests power from a relatively high-power ambient electromagnetic power field emitted as electromagnetic energy field 155 (from AEPH initialization node 116) to charge power storage 208 of the AEPH chip 120 to operate the chip controller 202, memory 204, and an RF front end 206, and/or other circuitry. Power storage 208 may comprise a power storage device such as, but not limited to, a rechargeable battery, a capacitive energy storage component, or other electrical charge storage device, for example. In some embodiments, a power management 209 function determines when power storage 208 is sufficiently charged to operate the chip controller 202, memory 204, and an RF front end 206, and/or other circuitry, and/or to initiate boot-up sequences.

When the AEPH chip 120 harvests power from the electromagnetic energy field 155, the functionality of the AEPH chip 120 may remain restricted. For example, in some embodiments, only a first tier processing 212 of the chip controller 202 may be active. For example, first tier processing 212 may initiate execution of one or more processes that prepare the AEPH chip 120 for further interactions with the AEPH interrogation node(s) 118, such as RF front end 206 and/or memory 204 functions. In this first tier of operation, an identity 216 stored in the memory 204 may be accessible but may not be writeable (other parts of the memory 204 may not be readable or writeable in the first tier of operation).

In some embodiments, the AEPH interrogation node(s) 118 trigger second tier processing 214 by transmitting an electromagnetic energy field comprising the interrogation signal 157. When the AEPH chip 120 is triggered by the AEPH interrogation node(s) 118, the functionality of the AEPH chip 120 may not be restricted and/or additional functionality may be operational. For example, in addition to the first tier of processing 212, the chip controller 202 may further provide a second tier of processing 214. In addition to the identity 216, a dynamic random access memory (DRAM) 218 may be activated and be readable and/or writeable in the second mode of operation of the AEPH chip 120. DRAM 218 may provide support for some of the second tier processing 214, for example by permitting the chip controller 202 to load instructions from a non-transitory memory portion of the memory 204 into the DRAM 218 and executing the instructions by the chip controller 202 out of the DRAM 218. In some embodiments, a radio adaptation application 220 stored in the memory 204 may be accessible and may be executed in the second tier of processing 214 of the chip controller 202, for example by virtue of loading at least some of the radio adaptation application 220 into the DRAM 218 by the chip controller 202 and executing those instructions out of DRAM 218. Moreover, in some embodiments, first tier processing 212 and second tier processing 214 are each respectively activated by ambient EM power fields of different respective frequencies respectively transmitted by the AEPH initialization node 116 and AEPH interrogation node(s) 118.

In some embodiments, a plurality of information 222 may be readable and writeable in the memory 204 by the AEPH interrogation node(s) 118. In some embodiments, the AEPH interrogation node(s) 118 may trigger operations of one or more sensors 226 to collect sense information about the environment surrounding the AEPH chip 120.

In by triggering the second tier processing, the RF front end 206 may support both radio transmitting and radio receiving. In the second tier processing, the RF front end 206 may support sophisticated functions like beam forming, and may support these sophisticated functions in different frequency bands, in different bandwidths, and at different data rates as configured in a set of radio parameters 228.

In some embodiments, the AEPH interrogation node(s) 118 may passively receive information from the AEPH chip 120 (e.g., via interrogation reply signal 158) establish a bidirectional wireless communication link 159 with the AEPH chip 120. The radio adaptation application 220 may conduct a communication initiation session with an AEPH interrogation node 118 wherein the radio adaptation application 220 determines a variety of radio parameters 228. For example, the radio adaptation application 220 may negotiate a frequency band for communication with the AEPH interrogation node 118 via wireless communication link 159. The radio adaptation application 220 may negotiate a data rate and/or radio frequency amplification power level parameters for communication with the AEPH interrogation node 118, and in some embodiments negotiate antenna beam forming parameters with the AEPH interrogation node 118.

In embodiments, an AEPH interrogation node 118 and AEPH chip 120 may initiate a trusted security zone communication operation mode, wherein the AEPH chip 120 executes at least part of the second tier processing 214 in a trusted security zone of the chip controller 202. The AEPH interrogation node 118 may correspondingly transition to execution in a trusted security zone of its own processor. When executing in the trusted security zone other processes (e.g., non-trusted processes) may be halted until the trusted processing ceases. This may prevent the other processes from monitoring trusted communications and/or secure data passing between the chip controller 202, the memory 204, the RF front end 206, and sensors 226. In an embodiment, the trusted security zone portion of the chip controller 202 is not active or accessible until triggered by the AEPH interrogation node 118 (e.g., by triggering second tier processing 214).

In embodiments, the AEPH interrogation node 118 may send a message to the AEPH chip 120 to capture information from one or more of the sensors 226. In response, the second tier processing 214 commands one or more of the sensors 226 to capture information from the environment surrounding the AEPH chip 120, for example temperature sense information, atmospheric pressure sense information, humidity sense information, etc., and to store the sensor data in the memory 204, for example in a non-transitory portion of the memory 204. The AEPH interrogation node 118 may send a message to the AEPH chip 120 to send stored sensor information via the wireless communication link 159 to the AEPH interrogation node 118. The AEPH interrogation node 118 may transmit the sensor information received from the AEPH chip 120 (or a plurality of AEPH chips 120) via network 130 to the data store 132 (e.g., to distributed ledger 133) and/or server application 136. The sensor data stored in the distributed ledger 133 may be accessed by the server application 136, which may process the sensor data in various ways, including performing statistical analysis on the data.

Although FIG. 2 illustrates an AEPH chip 120 wherein first and second processing tiers may be selectively activated in response to signals from the AEPH initialization node 116 and AEPH interrogation node(s) 118, it should be understood that in other embodiments, the AEPH chips 120 may comprising any number of selectable processing tiers. Moreover, although the signals exchanged between the AEPH initialization node 116 and AEPH interrogation node(s) 118, and the AEPH chip 120, are generally described herein in the context of wireless EM signals, embodiments are not so limited. It should be understood that in some embodiments, EM signals exchanged between the AEPH initialization node 116 and/or AEPH interrogation node(s) 118 with the AEPH chip 120 may be carried by electrical conductors.

Figure 3A:
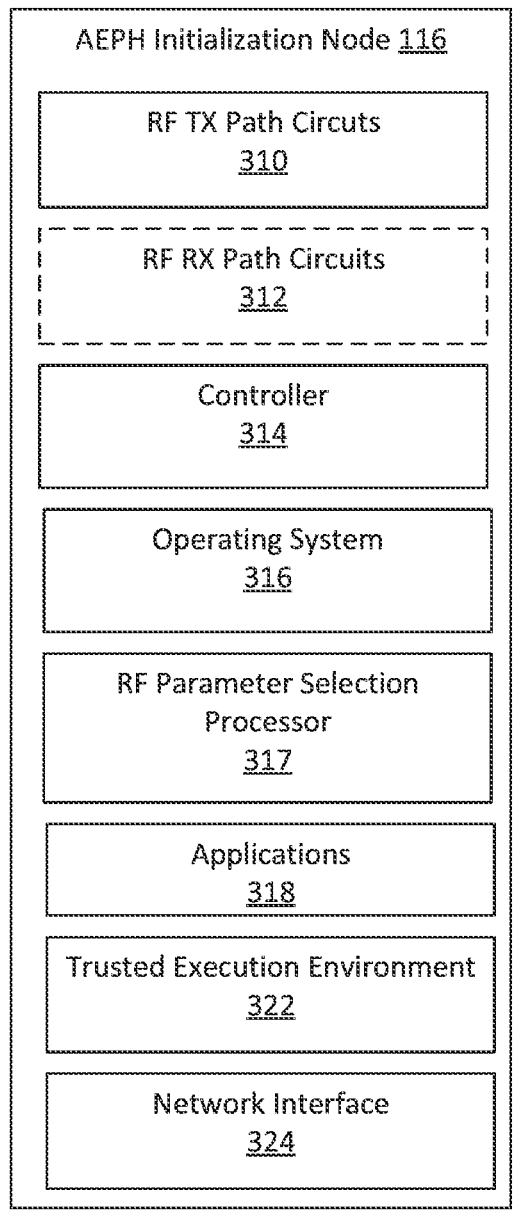
FIG. 3A is a diagram illustrating an example AEPH initialization node, in accordance with some embodiments described herein.

With reference now to FIG. 3A, FIG. 3A illustrates an example AEPH initialization node 116 in accordance with some embodiments. Although some embodiments may include other components, generally AEPH initialization node 116 includes one or more radio frequency (RF) transmit (TX) path circuits 310, and a controller 314. In some embodiments, an AEPH initialization node 116 may optionally comprise one or more RF receive (RX) path circuits 312 for receiving signals and/or data from the AEPH chip 120. RF TX path circuits 310 may comprise one or more radio circuit components such as, but not limited to, a modulator, digital up-converter, power amplifier, filters, digital-to-analog converters, and/or other related radio components for generating, modulating, and/or transmitting EM signals the AEPH chip 120. In some embodiments, data may be communicated by the controller 314 (or components of the AEPH initialization node 116) to the AEPH chip 120 via the RF TX path circuits 310. RF RX path circuits 312, when present, may comprise one or more radio circuit components such as a demodulator, digital down-converter, low-noise amplifier, filters, analog-to-digital converters, and/or other related radio components for receiving and/or demodulating RF interrogation reply signals received from the AEPH chip 120. Configuration of the RF TX path circuits 310 and/or RF RX path circuits 312 may be controlled by an RF parameter selection processor 317. In some embodiments one or both of the TX path circuits 310 and/or RF RX path circuits 312 may comprise a plurality of RF paths, each corresponding to different frequency bands.

In some embodiments, the RF TX path circuits 310 are used by the AEPH initialization node 116 to transmit wireless electromagnetic energy field 155 and/or RF signal bursts to the AEPH chip 120. In the embodiment shown in FIG. 3A, the AEPH initialization node 116 further includes an operating system 316 and one or more executable applications 318 that are executed by the controller 314 to implement the functions of the AEPH initialization node 116 described herein. In this embodiment, an application layer facilitates execution of the UE operating system 316 and applications 318, which include the AEPH RF parameter selection processor 317 and other applications that initiate tasks and perform transactions with the AEPH chip 120. In some embodiments, applications 318 may include applications executed in a rich environment and/or applications executed in a trusted execution environment (TEE) 322. For example, in some embodiments, the AEPH RF parameter selection processor 317 and/or one or more of the applications 318 may be resident on the AEPH initialization node 116, at least in part, within a hardware Root of Trust and hosted from the TEE 322, where they are protected from tampering or manipulation. In the embodiment of FIG. 3A, the AEPH initialization node 116 further comprises at least one network interface 324, through which the AEPH initialization node 116 can be coupled to network 130. The network interface 324 may comprise a wireless network interface or a wired network interface. One or more of the applications 318 may communicate with the network interface 324 in order to communicate via network 130 with server application 136 and/or distributed ledger 133.

Figure 3B:
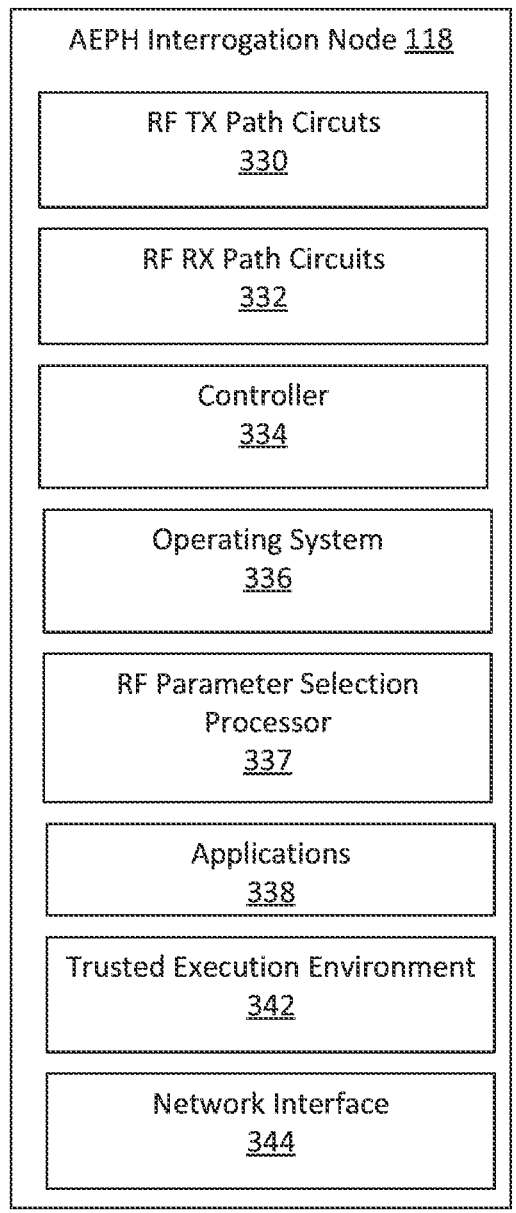
FIG. 3B is a diagram illustrating an example AEPH interrogation node, in accordance with some embodiments described herein.

With reference now to FIG. 3B, FIG. 3B illustrates an example AEPH interrogation node 118 in accordance with some embodiments. Although some embodiments may include other components, generally AEPH interrogation node 118 includes one or more radio frequency (RF) transmit (TX) path circuits 330, one or more RF receive (RX) path circuits 332, and a controller 334. RF TX path circuits 330 may comprise one or more radio circuit components such as, but not limited to, a modulator, digital up-converter, power amplifier, filters, digital-to-analog converters, and/or other related radio components for generating, modulating, and/or transmitting EM signals the AEPH chip 120. In some embodiments, data may be communicated by the controller 334 (or components of the A AEPH interrogation node 118) to the AEPH chip 120 via the RF TX path circuits 330. RF RX path circuits 332 may comprise one or more radio circuit components such as a demodulator, digital down-converter, low-noise amplifier, filters, analog-to-digital converters, and/or other related radio components for receiving and/or demodulating RF interrogation reply signals received from the AEPH chip 120. Configuration of the RF TX path circuits 330 and/or RF RX path circuits 332 may be controlled by an RF parameter selection processor 337. In some embodiments one or both of the TX path circuits 330 and/or RF RX path circuits 332 may comprise a plurality of RF paths, each corresponding to different frequency bands.

In some embodiments, the RF TX path circuits 330 are used by the AEPH interrogation node 118 to transmit electromagnetic energy fields 157 (e.g., interrogation signals) or RF signal bursts to the AEPH chip 120. The RF RX path circuits may be used by the AEPH interrogation node 118 to receive and demodulate interrogation reply signal 158 from the AEPH chip 120. In some embodiments, the RF TX path circuits 330 and RF RX path circuits 332 are used by the AEPH interrogation node 118 to establish the bidirectional communications link 159 with the AEPH chip 120.

In the embodiment shown in FIG. 3B, the AEPH interrogation node 118 further includes an operating system 336 and one or more executable applications 338 that are executed by the controller 334 to implement the functions of the AEPH interrogation node 118 described herein. In this embodiment, an application layer facilitates execution of the UE operating system 336 and applications 338, which include the AEPH RF parameter selection processor 337 and other applications that initiate tasks and perform transactions with the AEPH chip 120. In some embodiments, applications 338 may include applications executed in a rich environment and/or applications executed in a trusted execution environment (TEE) 342. For example, in some embodiments, the AEPH RF parameter selection processor 337 and/or one or more of the applications 338 may be resident on the AEPH interrogation node 118, at least in part, within a hardware Root of Trust and hosted from the TEE 342, where they are protected from tampering or manipulation. In the embodiment of FIG. BA, the AEPH interrogation node 118 further comprises at least one network interface 344, through which the AEPH interrogation node 118 can be coupled to network 130. The network interface 344 may comprise a wireless network interface or a wired network interface. One or more of the applications 338 may communicate with the network interface 344 in order to communicate via network 130 with server application 136 and/or distributed ledger 133. It should be noted that in some embodiments, an AEPH interrogation node 118 may also at times operate in an alternate mode as an AEPH initialization node 116 as described with respect to FIG. 3A.

Figure 4:
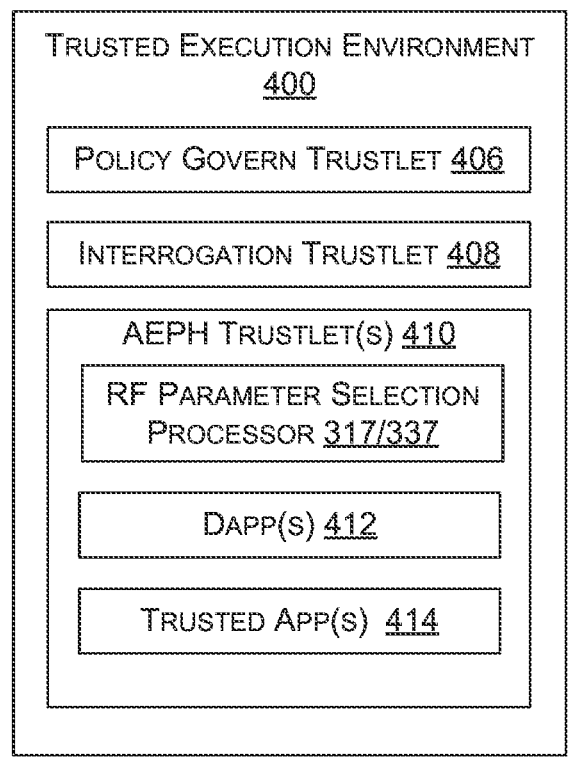
FIG. 4 is a diagram illustrating an example trusted execution environment for a AEPH initialization node or AEPH interrogation node, in accordance with some embodiments described herein.

Referring now to FIG. 4, a trusted execution environment (TEE) 400, such as used for TEE 322 and/or TEE 342, is illustrated. In some embodiments TEE 400 facilitates a secure area of the controllers 314, 334. That is, TEE 400 provides an environment in the AEPH initialization node 116 and/or AEPH interrogation node 118 where isolated execution and confidentiality features are enforced. Example TEEs include Arm TrustZone technology, Software Guard Extensions (SGX) technology, or similar. Generally, computer readable code executed in the TEE 400 is referred to as a "trustlet". A trustlet can securely access data stored memory of the AEPH initialization node 116 and/or AEPH interrogation node 118 that is otherwise inaccessible in the application layer. A trustlet may take the form of trusted processes, secure processes, isolated user mode (IUM) processes, or the like. For example, a trustlet executed in TEE 400 can access system level data (that is, data related to the larger machine the AEPH initialization node 116 and/or AEPH interrogation node 118 are incorporated within), private and/or public keys, and similar data stored, or accessed, by the AEPH initialization node 116 and/or AEPH interrogation node 118. Trustlets can be activated in response to various network or AEPH initialization node 116 and/or AEPH interrogation node 118 operations. For example, a trustlet can be activated by execution of an associated application 318, 338 in the application layer. For another example, a trustlet can be activated in response to a command generated by a network element (such as server application 136). The trustlet(s) activated may vary depending on the service requested. Upon activation, a trustlet performs a set of predetermined operations. The operations can include, but are not limited to: accessing data stored by the AEPH initialization node 116 and/or AEPH interrogation node 118, (such as a set keys that are embedded directly into a processor or microcontroller during manufacturing, certificates of authority, unique device identifiers, or any other data); monitoring operations of the AEPH initialization node 116 and/or AEPH interrogation node 118 (such as monitoring processor load, microcontroller load, activation of other device systems, or other similar device operations), access or monitor operations of other applications executed by the AEPH initialization node 116 and/or AEPH interrogation node 118; writing data to the memory of AEPH initialization node 116 and/or AEPH interrogation node 118; activate another trustlet; or any combination thereof.

In the embodiment depicted in FIG. 4, the TEE 400 illustratively includes a policy governing trustlet 406, an interrogation trustlet 408, and one or more AEPH trustlets 410. In other embodiments, a TEE 400 may include a fewer or greater number of trustlets.

Policy governing trustlet 406 corresponds to an illustrative example of computer readable code that is activated in response to execution of an application or operation. Upon activation, policy governing trustlet 406 may access a locally stored set of keys corresponding to the application and the device's processor. Such keys may be utilized for establishing a secured communication link 159 between the AEPH initialization node 116 and/or AEPH interrogation node 118 and AEPH chip 120 or other secured transactions. Additionally, policy governing trustlet 406 may access a device unique identifier (e.g., an international mobile equipment identity (IMEI)). The policy governing trustlet 406 may communicate the accessed data to a communication network for analysis.

Interrogation trustlet 408 corresponds to an illustrative example of computer readable code that is activated in response to a command from the communication network. An interrogation trustlet can be activated by a command that is generated in response to a determination that an AEPH initialization node 116 and/or AEPH interrogation node 118 is an unknown device or that they provided anomalous data for a requested network service. In response to activation, an interrogation trustlet 408 may activate other trustlets, access additional data, or perform any other trustlet operation. The interrogation trustlet 408 may communicate the accessed data to network 130. For example, interrogation trustlet 408 can be activated in response to a command that server application 136 has requested data from one or more trustlets executed in the trusted execution environment 322. In some embodiments, one or more of the AEPH trustless 410 are activated by the interrogation trustlet 408 in response to a command from the server application 136 or instructions from the distributed ledger 133.

The AEPH trustlets 410 corresponds to an illustrative example of computer readable code that may be activated in conjunction with initiation of communications between the AEPH initialization node 116 and/or AEPH interrogation node 118 and an AEPH chip 120. In some embodiments, the AEPH RF parameter selection processor 317, 337 is executed at least in part in the TEE 400. AEPH trustlets 410 may also include one or more decentralized applications 412, also known as Dapps, Dapps 412 typically operate on a blockchain or network of peer-to-peer network. In some embodiments, Dapps 412 comprise applications that engage directly with the distributed ledger 133. In some embodiments, the Dapps 412 utilize smart contracts to complete transactions between AEPH chip 120 and the distributed ledger 133 or other block chain based ledger. Likewise, one or more of the Dapps 412 can exchange information with the distributed ledger 133 based on information exchanged with the AEPH chip 120. In some embodiments, one or more of the Dapps 412 may be remotely loaded to the TEE 400, for example by the server application 136. Other trusted applets 414 may also be executed as AEPH trustlets 410 to perform one or more secure operations between the AEPH initialization node 116 and/or AEPH interrogation node 118 and the AEPC chip 120.

In some embodiments, the RF parameter selection processor 317, 337 determines a configuration of RF parameters for transmitting EM signals to the AEPH chip 120. For example, in some embodiments, a first application 318, 338 may activate a tier of processing (e.g., a first tier or second tier processing task) of the AEPH chip 120 by providing instructions to the controller 314, 334 to configure the RF TX path circuits 310, 330 to transmit an EM signal having RF parameters configured invoke the particular processing task. In response, the RF parameter selection processor 317 causes the controller 314 to configure the RF TX path circuits 310 to transmit an EM signal having the specified RF parameters to trigger the desired task in the AEPH chip 120.

Figure 5:
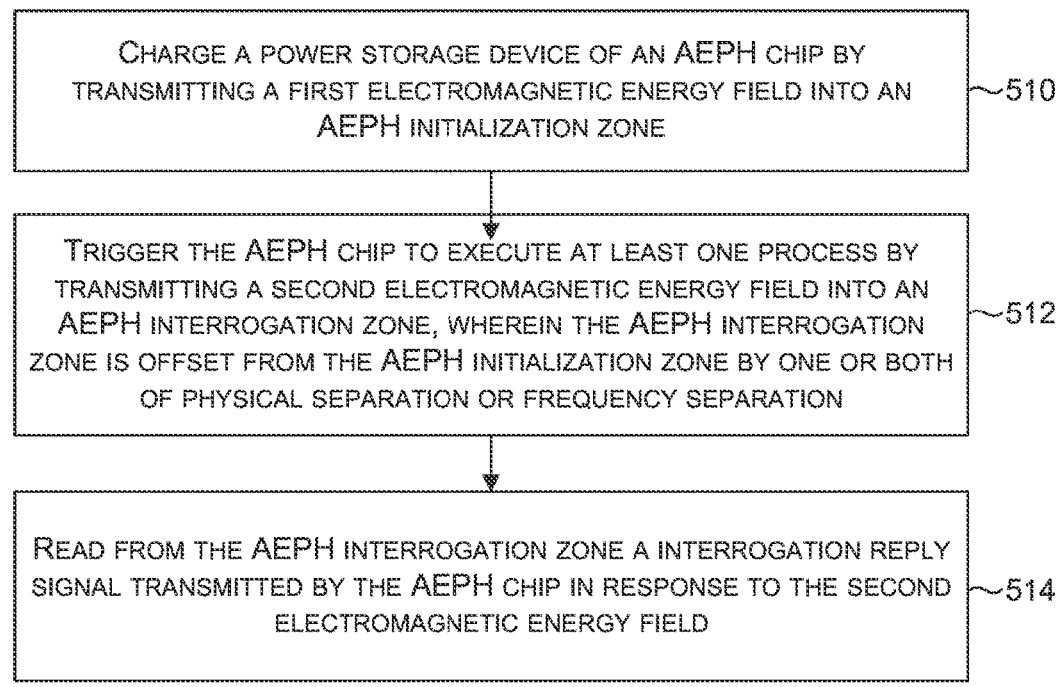
FIG. 5 is a flow chart illustrating an example method for or processing information from an AEPH chip, in accordance with some embodiments described herein.

FIG. 5 is a flow chart illustrating a method 500 for processing information from an AEPH chip, according to one embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing one or more processers as disclosed elsewhere herein.

In some embodiments, the method 500 is performed using an AEPH initialization node and AEPH interrogation node such as those described herein. The AEPH initialization node and AEPH interrogation node can be arranged with respect to the conveyance mechanism such that as items travel via the conveyance mechanism, they first encounter the AEPH initialization node and then the AEPH interrogation node.

The method 500 begins at 510 with charging a power storage device of an AEPH chip by transmitting a first electromagnetic energy field into an initialization zone. In some embodiments, an AEPH chip (such as AEPH chip 120) initially enters an AEPH initialization zone. The AEPH initial zone may be located along the path of a conveyance mechanism that carries one or more items. The AEPH chip may be affixed to, or embedded in, such items. Within the AEPH initialization zone, a power storage component of the AEPH chip (such as a battery or capacitive device) is charged by the wireless electromagnetic energy field. In some embodiment, charging of the power storage component also initiates a boot-up or initialization sequence within the AEPH chip that executes one or more processes in anticipation of upcoming interrogation tasks or other processes. For example, charging of the power storage component may initialize execution of first tier processing 212 tasks such as described above.

The method proceeds to 512 with triggering the AEPH chip to execute at least one process by transmitting a second electromagnetic energy field into an AEPH interrogation zone, wherein the AEPH interrogation zone is offset from the AEPH initialization zone. The offset may comprise physical separation and/or separation with respect to RF frequency, channel, or band of signals used within the respective zones. The second electromagnetic energy field may be transmitted at a frequency and/or frequency band different from the frequency and/or frequency band of the first electromagnetic energy field. For example, in one embodiment the first electromagnetic energy field comprises a 47 GHz band signal while the second electromagnetic energy field comprises a 2.5 GHz band or 1900 MHz band signal. Furthermore, the second electromagnetic energy field does not need to be a high power field (and may have a lower signal power than the first electromagnetic energy field) because the power storage device of the AEPH chip has already been powered by the first electromagnetic energy field. In some embodiments, the AEPH chip may be non-responsive to the second electromagnetic energy field interrogation signal if it has not initially received the first electromagnetic energy field to charge its power storage and initiate a boot-up sequence.

Separation of the AEPH initialization zone from AEPH interrogation zone(s) by an offset has several beneficial consequences. For example, the first electromagnetic energy field can be increased in power accordingly to support faster AEPH chip charging rates without substantial backscatter of the electromagnetic energy field interfering with the reading of the AEPH chip in the AEPH interrogation zone. As discussed above, the AEPH chip may be triggered to perform one or more operations in response to the second electromagnetic energy field. For example, the second electromagnetic energy field may be transmitted at a frequency (different from the frequency of the first electromagnetic field) that triggers the AEPH chip to initialize execution of second tier processing 214 tasks such as described above. In some embodiments, the second electromagnetic energy field triggers the AEPH chip to perform one or more tasks or operations, and return a result (e.g., via a reply signal). For example, the AEPH chip may respond to receiving the second electromagnetic energy field by accessing its memory to read information such as, but not limited to, item identification information (e.g., an item ID), and transmit that information back to an AEPH interrogation zone. In some embodiments, an AEPH interrogation node may trigger a plurality of different second frequencies each different from the first frequency of the first electromagnetic energy field. In this way, the an AEPH interrogation node may selectively trigger different operations within the AEPH chip associated with different tasks, and receive different information in reply. Moreover, in some embodiments, performing any one task or transaction with the AEPH chip may involve transmitting a sequence of several electromagnetic signals to invoke a set of various subtasks within the AEPH chip.

At 514, the method 500 includes reading from the AEPH interrogation zone an interrogation reply signal transmitted by the AEPH chip in response to the second electromagnetic energy field. The reply signal may carry response data such as item identification information. In some embodiments, response data may be transmitted via a bidirectional wireless communication link between the AEPH initialization node and the AEPH chip that was established by a process triggered by the second electromagnetic signal.

In some embodiments, the interrogation reply signal may include identification information, such as but not limited to, one or more GS1 Identification Numbers, from the AEPH chip. The method may accordingly further include communicating information read from the AEPH chip, such as to a server application and/or distributed ledger for example. For example, based on the identification information, the method may further include querying server application 136 to obtain additional information about an item associated with the AEPH chip (e.g., item 122), and/or to carry out other operations using the AEPH chip. In some embodiments, the server application may communicate with the distributed ledger to write information received from the AEPH chip to the distributed ledger. The server application may also read from the distributed ledger to obtain information about an item in response to identification information read from the AEPH chip.

For example, in some embodiments the method may include verifying that a serial number read from the AEPH chip is valid by comparing it to a record of the distributed ledger. The method may also include obtaining information from the distributed ledger or other source to be written back to the AEPH chip. For example, the method may write back to the AEPH chip information indicating that information on the AEPH chip has been confirmed as authentic, to replace or supplant item identification information with additional information, or to supplement original information from a manufacture with vendor (e.g., supplier) information.

In some embodiments, the method may comprise interfacing with a plurality of AEPH chips concurrently. For example, in some embodiments, a container (e.g., a box or carton) may carry a plurality of items each having their own respective AEPH chip with information about that item. In such embodiments, the AEPH chips may each be initialized and interrogated concurrently. In this way, the method by charging and initializing each of the AEPH chips, and then interrogating each of the chips, can collect a complete set of information about each of the items within the container. In some embodiments, an AEPH chip for the container may be written to (e.g., by a AEPH interrogation node) to include information about the items within the container, based on information read from AEPH chips for those items. For example, an item count or inventory can be written to the AEPH chip for the container. Moreover, the distributed ledger may be updated to associate an item ID for the container with the specific item IDs for the items in the container. In some embodiments, a printed label is affixed to the container with a code (e.g., a bar code or QR-code) that when read by an optical reader, may be used by an application to refer back to the updated record of the distributed ledger to obtain information about the contents of the container, or other information.

Figure 6:
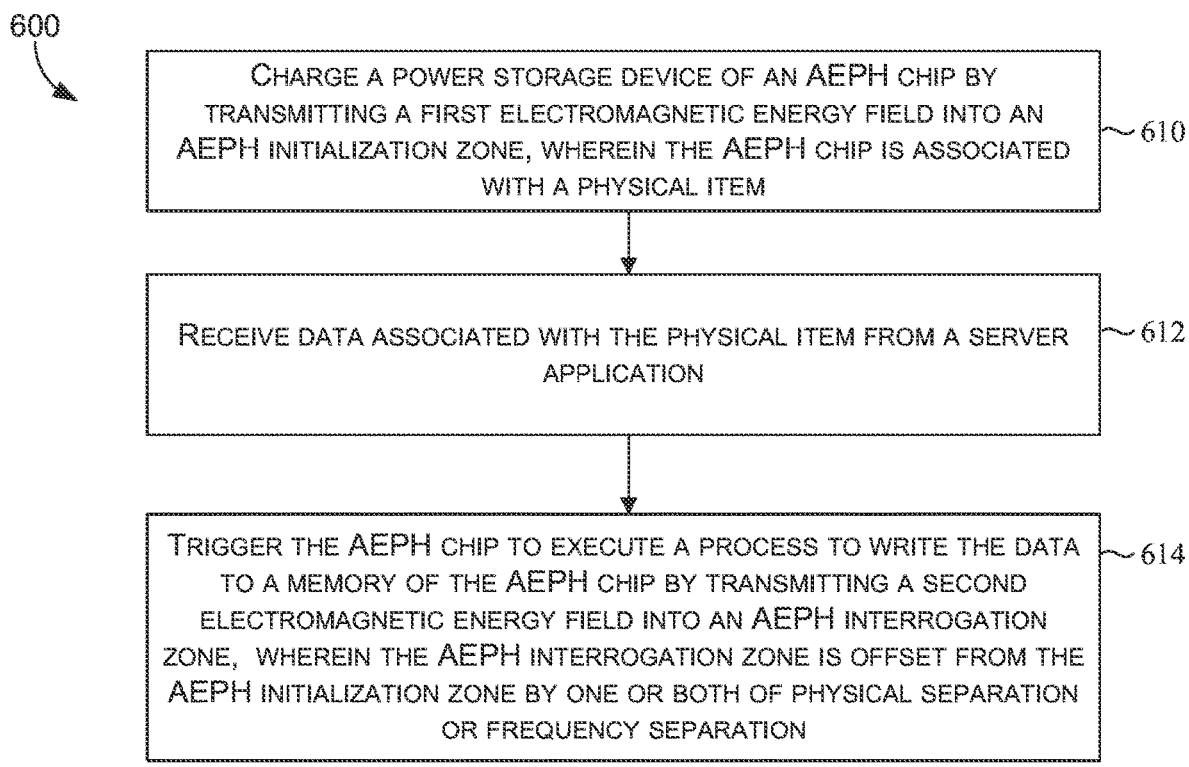
FIG. 6 is a flow chart illustrating another example method for updating information on an AEPH chip, in accordance with some embodiments described herein.

FIG. 6 is a flow chart illustrating a method 600 for updating information on an AEPH chip according to one embodiment. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing a processor as disclosed elsewhere herein. In some embodiments, the method 600 is performed using an AEPH initialization node and AEPH interrogation node such as those described herein.

As discussed above, in some embodiments, an AEPH interrogation node may facilitate interactions between the AEPH chip and a distributed ledger and/or a server application. The distributed ledger can comprise a blockchain based distributed ledger such as, but not limited to, a HyperLedger, for example.

For example, in some embodiments, the AEPH interrogation node may obtain identification information from a server application that is relevant to an item (e.g., a product, unit of equipment, unit of inventory, and the like). Such identification information may include, for example, trade item information, supply chain partner information, product serial numbers, product batch/lot numbers, logistic information such as container codes, or similar product related information. Based on the identification information, the AEPH interrogation node may update an AEPH chip associated with an item.

An example of such a process is illustrated by the method 600 of FIG. 6. As shown in FIG. 6, method 600 includes at 610 charging a power storage device of an AEPH chip by transmitting a first electromagnetic energy field into an AEPH initialization zone, wherein the AEPH chip is associated with a physical item. The AEPH chip may be affixed to, or embedded in, such physical items (such as items 122, for example). Within the AEPH initialization zone, a power storage component of the AEPH chip (such as a battery or capacitive device) is charged by the wireless electromagnetic energy field, and may initiate a boot-up or initialization sequence within the AEPH chip that executes one or more processes.

The method 600 proceeds to 612 with receiving data from a server application for writing to the AEPH chip. This data may be associated with the physical item. In some embodiments, the data may be received from a distributed ledger, or otherwise received in response to a query to the server application based on information previously read from the AEPH chip (such as item identification information, for example). In some embodiments, the server application may communicate with the distributed ledger to obtain the data to be written to the AEPH chip in response to identification information previously read from the AEPH chip. The method proceeds to 614 with triggering the AEPH chip to execute a process to write the data to a memory of the AEPH chip by transmitting a second electromagnetic energy field into an AEPH interrogation zone, wherein the AEPH interrogation zone is offset from the AEPH initialization zone. The offset may be with respect to one or both of physical separation or frequency separation. The second electromagnetic energy field may comprise one or more second frequencies different from a first frequency of the first electromagnetic energy field. In some embodiments, the method may further record operations between the AEPH interrogation node and the AEPH chip to the distributed ledger. In some embodiments, rather than (or in addition to) communicating with the distributed ledger via a server application, the distributed ledger comprises one or more smart contracts that one or more applications (such as Dapps 412) interact with directly.

Although FIG. 1 generally illustrates an embodiment where items 122 and their corresponding AEPH chips 120 are carried by a conveyance mechanism 152 in a series fashion though the AEPH initialization zone 154 and AEPH interrogation zone 156, in other embodiments, one or both of the AEPH initialization node 116 and AEPH interrogation node(s) 118 may be implemented on mobile platforms (such a robots or autonomous machines, for example). In such embodiments, the relative motion between the AEPH initialization node 116 and AEPH interrogation node(s) 118, and the AEPH chips 120, may be obtained by the mobile AEPH initialization node 116 and AEPH interrogation node(s) 118 travelling past the AEPH chips 120 (which may be either stationary, or also in motion, themselves). In such an embodiment, the AEPH chip 120 enters the AEPH initialization zone 154 as the AEPH initialization node 116 travels past the AEPH chip 120. Then, after the AEPH chip 120 is charged and initialized (as described above), the AEPH chip 120 enters the AEPH interrogation zone 154 as an AEPH interrogation node 118 travels past the AEPH chip 120. While the AEPH chip 120 is in the AEPH interrogation zone 154, the mobile AEPH interrogation node 118 can interact with the AEPH chip 120 (e.g., to read and/or write information) as described elsewhere herein.

Figure 7A:
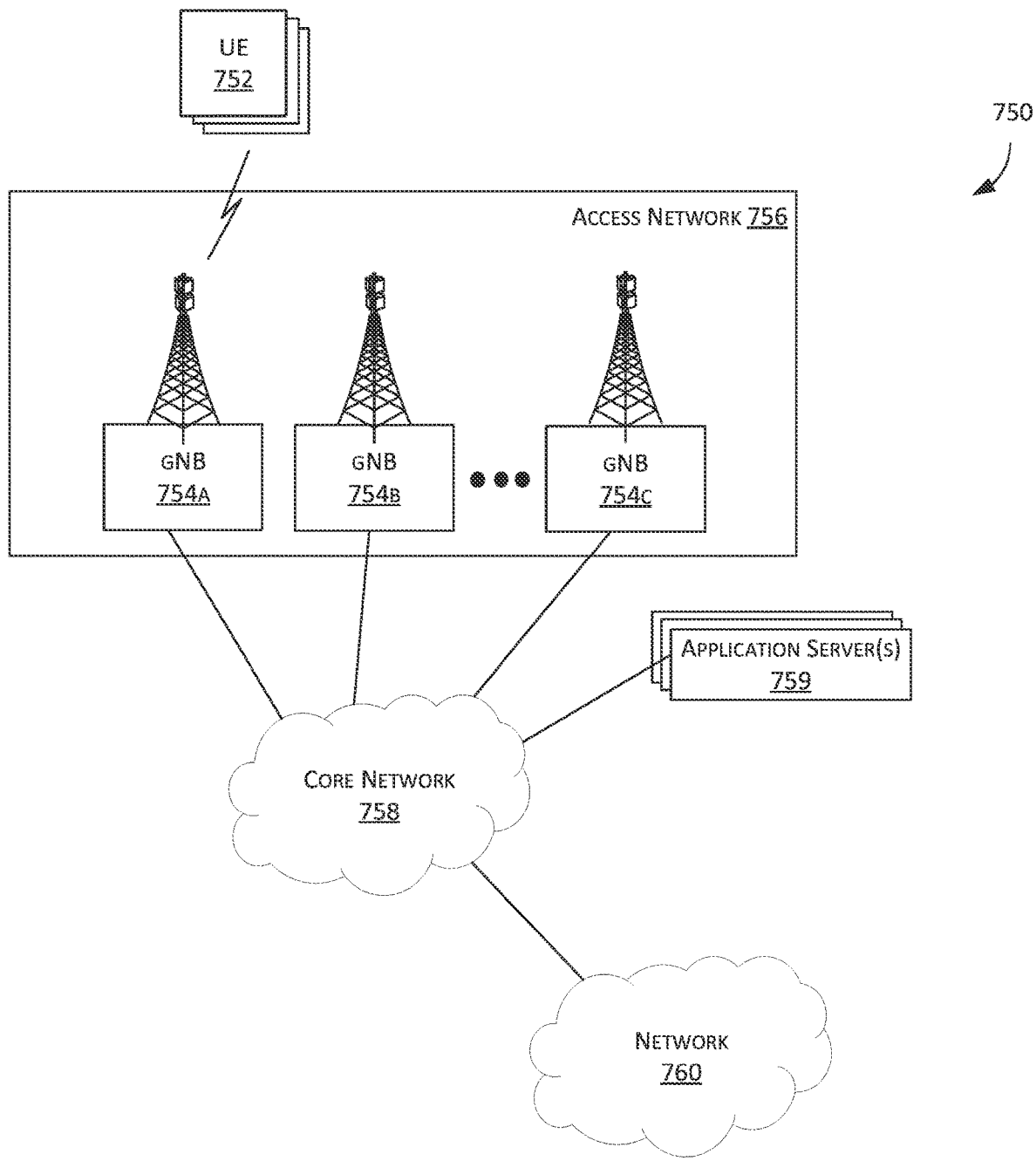
FIGS. 7A and 7B are block diagrams illustrating an example communication network according to an embodiment described herein.

Turning now to FIG. 7A, FIG. 7A illustrates an exemplary communication system 750 according to one embodiment. In an embodiment, at least a portion of the network 130 described herein comprises a communications network consistent with communication system 750. Typically the communication system 750 includes a number of access nodes 754 that are configured to provide wireless network coverage in which UEs 752 such as cell phones, tablet computers, machine-type-communication devices, tracking devices, embedded wireless modules, and/or other wirelessly equipped communication devices (whether or not user operated), can operate. In some embodiments, one or more of the UEs 752 comprise a AEPH initialization node 116 and/or AEPH interrogation node 118 as described herein. In some such embodiments, the network interface 324, 324 of the AEPH initialization node 116 and/or AEPH interrogation node 118 comprises an interface for communicating uplink and downlink wireless RF communications with an access node 754. In some embodiments, one or more of the access nodes 754 define an access network 756, which may be referred to as a radio access network (RAN) in some contexts. In a 5G technology generation an access node 754 may be referred to as a gNodeB (gNB). In 4G technology (e.g., long term evolution (LTE) technology) an access node 754 may be referred to as an evolved NodeB (eNB). In 3G technology (e.g., code division multiple access (CDMA) and global system for mobile communication (GSM)) an access node 754 may be referred to as a base reader-writer station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations. In still other embodiments, an access node 754 may implement a different wireless network technology such as, but not limited to IEEE 802.11 (WiFi) or IEEE 802.16 (WiMAX) related technologies.

In an embodiment, the access network 756 comprises a first access node 754 a, a second access node 754 b, and a third access node 754 c. It is understood that the access network 756 may include any number of access nodes 754. Further, each access node 754 may be coupled with a core network 758 that provides connectivity with various application servers 759 and/or a network 760 (e.g., such as network 130). In some embodiments, server application 136 and/or distributed ledger 133 are hosted on an application server 759.

In an embodiment, one or more application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 may engage in air-interface communication with an access node 754 and thereby communicate via the access node 754 with various application servers and other entities.

In some embodiments, communication system 750 operates in accordance with a particular radio access technology (RAT), with communications from an access node 754 to UEs 772 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), and "5G", which now facilitate mobile broadband service using technologies such as orthogonal frequency division multiplexing (OFDM) and multiple input multiple output (MIMO). "5G" technologies, and particularly "5G NR" (5G New Radio), may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). In some implementations, 5G may provide, for example, as much as 20 gigabits per second (Gbps) downlink data throughput and as much as 10 Gbps uplink data throughput. Each access node 754 may provide service on one or more radio-frequency (RF) carriers, each of which may be frequency division duplex (FDD), with separate frequency channels for downlink and uplink communication, or time division duplex (TDD), with a single frequency channel multiplexed over time between downlink and uplink use. Each such frequency channel may be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 may define an air interface configured in a specific manner to define physical resources for carrying information wirelessly between the access node 754 and UEs 752.

Without limitation, for instance, the air interface may be divided over time into frames, subframes, and symbol time segments, and over frequency into subcarriers that may be modulated to carry data. The example air interface may thus define an array of time-frequency resource elements each being at a respective symbol time segment and subcarrier, and the subcarrier of each resource element may be modulated to carry data. Further, in each subframe or other transmission time interval (TTI), the resource elements on the downlink and uplink may be grouped to define physical resource blocks (PRBs) that the access node may allocate as needed to carry data between the access node and served UEs 752. In addition, certain resource elements on the example air interface may be reserved for special purposes. For instance, on the downlink, certain resource elements may be reserved to carry synchronization signals that UEs 752 may detect as an indication of the presence of coverage and to establish frame timing, other resource elements may be reserved to carry a reference signal that UEs 752 may measure in order to determine coverage strength, and still other resource elements may be reserved to carry other control signaling such as PRB-scheduling directives and acknowledgement messaging from the access node 754 to served UEs 752. And on the uplink, certain resource elements may be reserved to carry random access signaling from UEs 752 to the access node 754, and other resource elements may be reserved to carry other control signaling such as PRB-scheduling requests and acknowledgement signaling from UEs 752 to the access node 754. An access node 754, in some instances, may be split functionally into a radio unit (RU), a distributed unit (DU), and a central unit (CU). The RU provides radio functions. The DU provides L1 and L2 real-time scheduling functions, and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
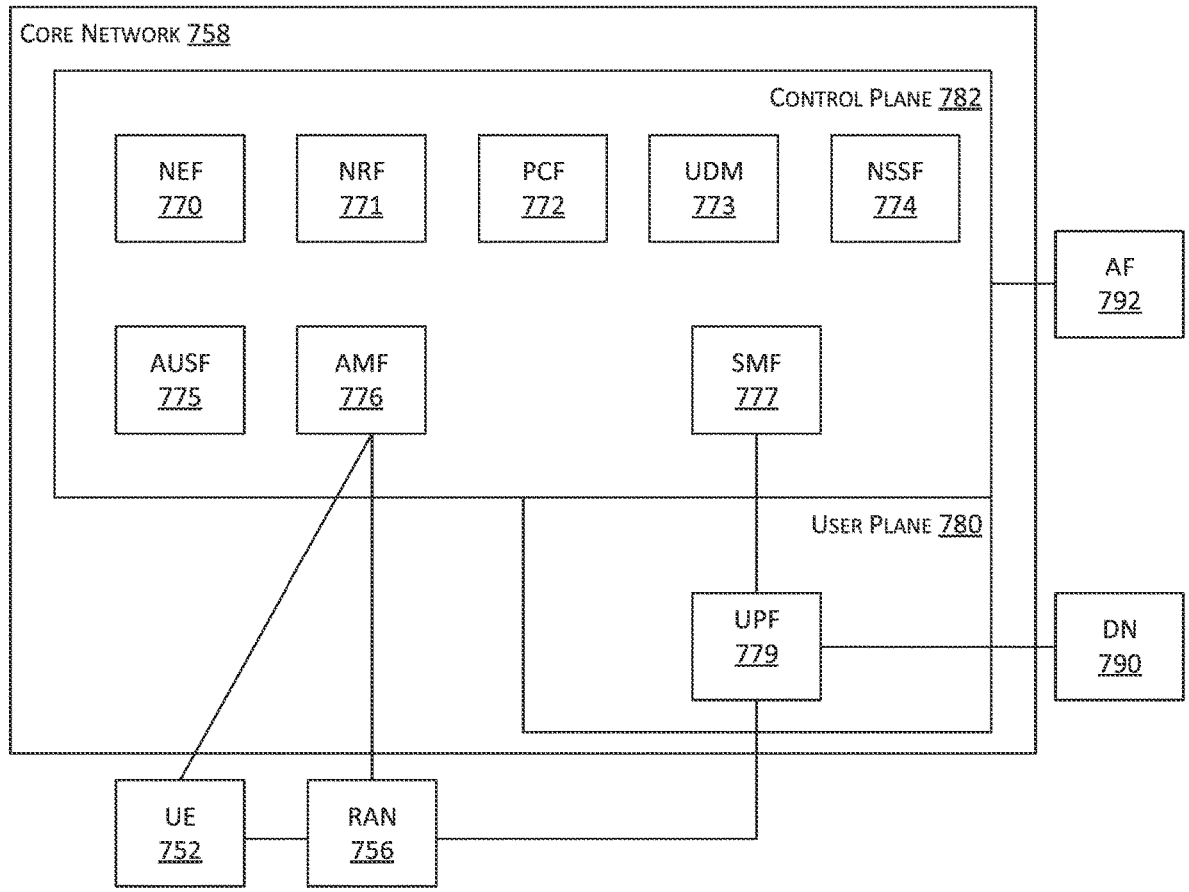

Turning now to FIG. 7B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment. In some embodiments one or more of the server applications 136 discussed herein that communicate with the AEPH initialization node 116, AEPH interrogation node 118, and/or distributed ledger 133 are implemented at least in part as microservices by the core network 758.

The UPF 779 delivers packet processing and links the UE 752, via the access network 756, to a data network 790 (e.g., the network 130 illustrated in FIG. 1). The AMF 776 handles registration and connection management of non-access stratum (NAS) signaling with the UE 752. That is, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 759 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 8:
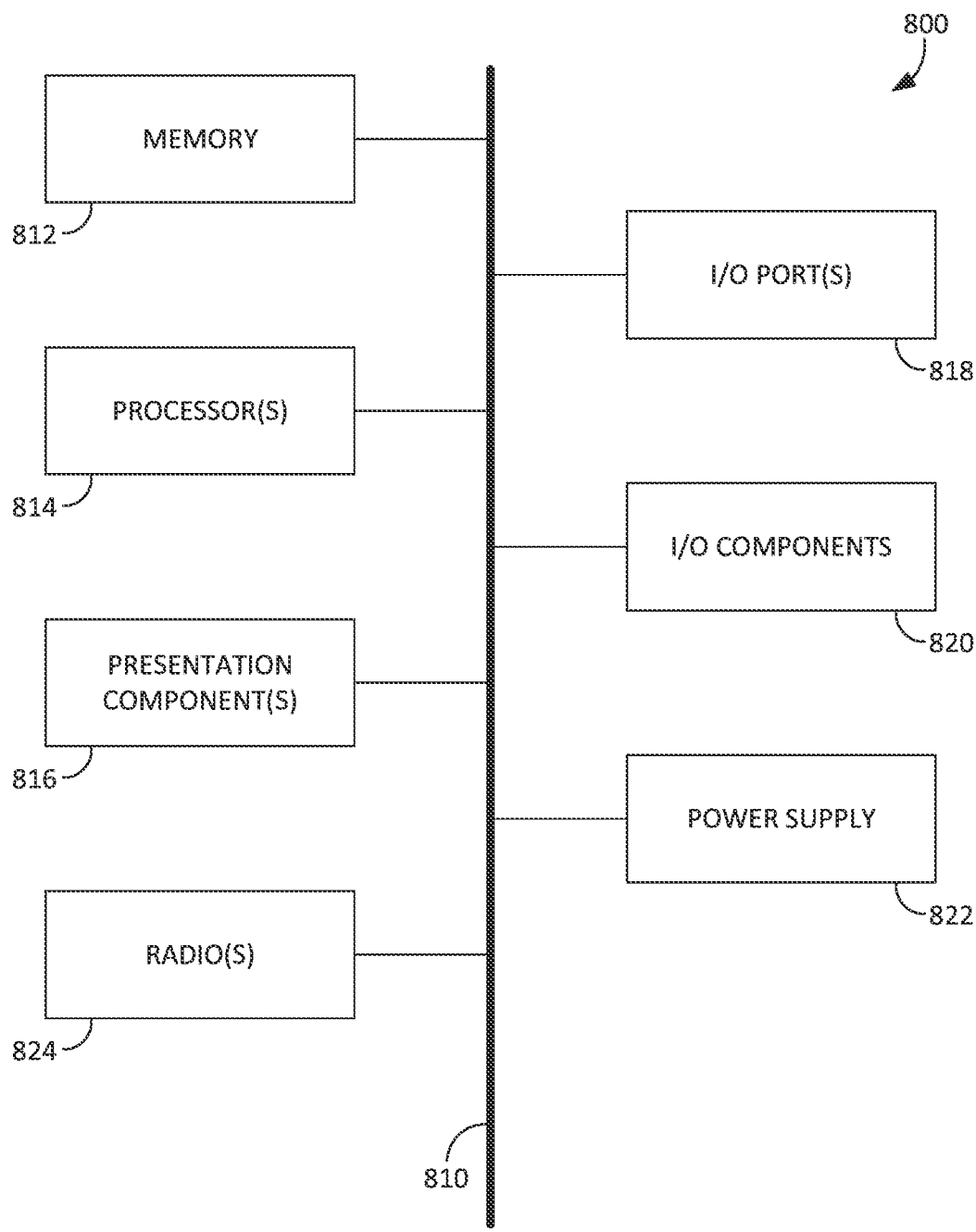
FIG. 8 is diagram illustrating an example computing environment according to an embodiment.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "IoT device", "smart appliance", "workstation," "server," "laptop," "handheld device," etc., as all are contemplated within the scope of FIG. 8 and refer to "computer" or "computing device." In some embodiments, the AEPH initialization node 116 and/or AEPH interrogation node 118 as described in any of the examples of this disclosure may be implemented at least in part by code executed by one or more circuits of the one or more processors(s) 814 in conjunction with use of the memory 812.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 presents data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments. In some embodiments, the RF transmit path circuits and RF receive path circuits for communicating with the AEPH chip 120 each are implemented by one or more radio paths of the radio(s) 824.

In various alternative embodiments, system and/or device elements, method steps, or example implementations described throughout this disclosure (such as the AEPH initialization node and/or AEPH interrogation node, applications, server applications, distributed ledgers, or subcomponents thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system comprising:
   one or more processors; and
   one or more computer-readable media storing computer-usable instructions that, when executed by the one or more processors, cause the one or more processors to:
   charge a power storage device of an ambient electromagnetic power harvesting (AEPH) chip by transmitting a first electromagnetic energy field into an AEPH initialization zone;
   trigger the AEPH chip to execute at least one process by transmitting a second electromagnetic energy field into an AEPH interrogation zone, wherein the AEPH interrogation zone is offset from the AEPH initialization zone by one or both of physical separation or frequency separation; and read from the AEPH interrogation zone an interrogation reply signal transmitted by the AEPH chip in response to the second electromagnetic energy field.

2. The system of claim 1, wherein the second electromagnetic energy field is transmitted at a different frequency than the first electromagnetic energy field.

3. The system of claim 1, wherein the second electromagnetic energy field is transmitted at lower radio frequency (RF) power than the first electromagnetic energy field.

4. The system of claim 1, the one or more processors further to:
establish a secured bidirectional communication link between the system and the AEPH chip within the AEPH interrogation zone.

5. The system of claim 1, the one or more processors further to:
receive data via a network; and
trigger the AEPH chip to execute a process to write the data to a memory of the AEPH chip by transmitting a third electromagnetic energy field carrying the data into the AEPH interrogation zone.

6. The system of claim 1, further comprising:
an AEPH initialization node, wherein the AEPH initialization node transmits the first electromagnetic energy field into the AEPH initialization zone; and
at least one AEPH interrogation node, wherein the at least one AEPH interrogation node transmits the second electromagnetic energy field into the AEPH interrogation zone and receives the interrogation reply signal from the AEPH interrogation zone.

7. The system of claim 1, the one or more processors further to:
communicate information from the interrogation reply signal to a server application or a distributed ledger via a network based.

8. The system of claim 1, the one or more processors further to:
execute at least one distributed application in a trusted execution environment; and
with the at least one distributed application, exchange a second information with a distributed ledger via a network based on a first information exchanged with the AEPH chip via the AEPH interrogation zone.

9. The system of claim 1, the one or more processors further to:
using a first information from the interrogation reply signal, write a second information at least in part derived from the first information to at least one other AEPH chip.

10. The system of claim 9, the one or more processors further to:
trigger the at least one other AEPH chip to execute a process to write the second information to a memory of the at least one other AEPH chip by transmitting a third electromagnetic energy field carrying the second information into the AEPH interrogation zone.

11. The system of claim 1, wherein the at least one process comprises at least one of:
reading information from a memory of the AEPH chip;
saving information to the memory of the AEPH chip;
transferring information between a distributed ledger and the memory of the AEPH chip; and
establishing an encrypted communication link between the AEPH chip and the system.

12. A method comprising:
charging a power storage device of an ambient electromagnetic power harvesting (AEPH) chip by transmitting a first electromagnetic energy field into an AEPH initialization zone;
causing the AEPH chip to execute at least one process by transmitting a second electromagnetic energy field into an AEPH interrogation zone, wherein the AEPH interrogation zone is offset from the AEPH initialization zone by one or both of physical separation or frequency separation; and
reading from the AEPH interrogation zone an interrogation reply signal transmitted by the AEPH chip in response to the second electromagnetic energy field.

13. The method of claim 12, further comprising:
conveying an item comprising the AEPH chip from the AEPH initialization zone to the AEPH interrogation zone.

14. The method of claim 12, wherein the second electromagnetic energy field is transmitted at a different frequency than the first electromagnetic energy field; and
wherein the second electromagnetic energy field is transmitted at lower radio frequency (RF) power than the first electromagnetic energy field.

15. The method of claim 12, further comprising:
writing data to a memory of the AEPH chip by transmitting a third electromagnetic energy field carrying the data into the AEPH interrogation zone.

16. A system comprising:
at least one ambient electromagnetic power harvesting (AEPH) initialization node comprising at least a first processor comprising one or more circuits to charge a power storage device of an AEPH chip by transmitting a first electromagnetic energy field into an AEPH initialization zone; and
at least one AEPH interrogation node comprising at least a second processor comprising one or more circuits to:
trigger the AEPH chip to execute at least one process by transmitting a second electromagnetic energy field into an AEPH interrogation zone, and
read from the AEPH interrogation zone an interrogation reply signal transmitted by the AEPH chip in response to the second electromagnetic energy field;
wherein the AEPH interrogation zone is offset from the AEPH initialization zone by one or both of physical separation or frequency separation.

17. The system of claim 16, further comprising:
a conveyance mechanism arranged to convey an item comprising the AEPH chip from the AEPH initialization zone to the AEPH interrogation zone.

18. The system of claim 16, wherein one or both of the at least one AEPH initialization node the at least one AEPH interrogation node is implemented on a mobile platform.

19. The system of claim 16, the second processor comprising the one or more circuits further to:
receive data via a network; and
trigger the AEPH chip to execute a process to write the data to a memory of the AEPH chip by transmitting a third electromagnetic energy field carrying the data into the AEPH interrogation zone.

20. The system of claim 16, the second processor comprising the one or more circuits further to:
communicate information from the interrogation reply signal to a server application or a distributed ledger via a network based.

* * * * *